US012227016B2

(12) United States Patent
Stowitts

(10) Patent No.: US 12,227,016 B2
(45) Date of Patent: Feb. 18, 2025

(54) DIGITAL DECORATION ON NON-ABSORBENT SURFACES WITH THERMALLY ASSISTED CURING

(71) Applicant: Ball Corporation, Westminster, CO (US)

(72) Inventor: Adam P. S. Stowitts, Arvada, CO (US)

(73) Assignee: BALL COPORATION, Westminster, CO (US)

( * ) Notice: Subject to any disclaimer, the term of this patent is extended or adjusted under 35 U.S.C. 154(b) by 127 days.

(21) Appl. No.: 17/795,665

(22) PCT Filed: Jan. 26, 2021

(86) PCT No.: PCT/US2021/015125
§ 371 (c)(1),
(2) Date: Jul. 27, 2022

(87) PCT Pub. No.: WO2021/154751
PCT Pub. Date: Aug. 5, 2021

(65) Prior Publication Data

US 2023/0091725 A1 Mar. 23, 2023

Related U.S. Application Data

(60) Provisional application No. 62/966,340, filed on Jan. 27, 2020.

(51) Int. Cl.
*B41J 3/407* (2006.01)
*B41J 11/00* (2006.01)

(52) U.S. Cl.
CPC ........... *B41J 3/40733* (2020.08); *B41J 3/407* (2013.01); *B41J 3/4071* (2013.01); *B41J 3/4073* (2013.01); *B41J 3/40731* (2020.08); *B41J 11/002* (2013.01)

(58) Field of Classification Search
CPC ...... B41J 3/40733; B41J 3/407; B41J 3/4071; B41J 3/4073; B41J 3/40731; B41J 11/002
See application file for complete search history.

(56) References Cited

U.S. PATENT DOCUMENTS 10,611,176 B2 4/2020 Wang et al.
11,697,283 B2 * 7/2023 Thate .................... B41J 3/4073 101/38.1

(Continued)

FOREIGN PATENT DOCUMENTS

AU 2018271400 B2 11/2019
EP 1147892 A2 10/2001

(Continued)

OTHER PUBLICATIONS

Canadian Examination Report for corresponding Canadian Patent Application No. 3168829 dated Oct. 25, 2023.
International Search Report; priority document.

*Primary Examiner* — Geoffrey S Mruk
(74) *Attorney, Agent, or Firm* — Greer, Burns & Crain, Ltd.

(57) ABSTRACT

A container component decorating apparatus (10) delivers one or more art graphics to a plurality of container components in a manufacturing queue. A container component handling module (200) has one or more holders (204) which retain the container components to the apparatus (10). The apparatus (10) has a supply of one or more fluids which are to be deposited onto the container components; A source of thermal energy (240) is thermally couplable to the container component. A thermal energy is transferred from the source to the container component prior to one or more fluid droplets from the source fluid being deposited on a non-absorbent surface of the container component.

22 Claims, 8 Drawing Sheets

(56) References Cited

U.S. PATENT DOCUMENTS

| | | | | |
|---|---|---|---|---|
| 11,708,300 | B2 * | 7/2023 | Urquhart ............... | C03C 17/005<br>53/131.4 |
| 2013/0140745 | A1 | 6/2013 | Preckel et al. | |
| 2019/0011855 | A1 | 4/2019 | Wang et al. | |
| 2019/0134993 | A1 | 5/2019 | Leo et al. | |
| 2023/0091725 | A1 | 3/2023 | Stowitts | |

FOREIGN PATENT DOCUMENTS

| | | | | |
|---|---|---|---|---|
| EP | 4093613 | A1 | 11/2022 | |
| GB | 0835738 | A1 * | 4/1998 | ............. B29C 59/02 |
| WO | 2021154751 | A1 | 8/2021 | |

* cited by examiner

DIGITAL DECORATION ON NON-ABSORBENT SURFACES WITH THERMALLY ASSISTED CURING

CROSS-REFERENCE TO RELATED APPLICATIONS

This Application is a United States National Stage Application under 35 U.S.C. Section 371 of International Patent Application No. PCT/US2021/015125 filed on Jan. 26, 2021, which is hereby incorporated by reference as if fully set forth herein. This Application also claims priority to and the benefit of U.S. Provisional Application No. 62/966,340 filed on Jan. 27, 2020, which is also hereby incorporated by reference as if fully set forth herein.

FEDERALLY SPONSORED RESEARCH OR DEVELOPMENT

N/A

TECHNICAL FIELD

The invention relates to decorating containers; more particularly, the invention relates to digital decorating on non-absorbent surfaces of containers.

BACKGROUND

Recent developments in container body decorating allow manufacturers to produce consecutively decorated container bodies having unique finished art relative to each other on a single dry offset container body decorator. Prior to these recent developments, consecutively decorated container bodies exhibited identical finished art. Some of these recent developments are disclosed in U.S. Patent Application Publication No. 2015/0174891 A1 corresponding to U.S. application Ser. No. 14/412,585, which is hereby incorporated by reference as if fully set for herein and for a particular purpose of describing the dry rotary offset printing process as it relates to metallic container bodies for two-piece containers.

In a typical dry rotary offset container body decorator, cartridges are supplied with colored ink that is eventually applied onto a cylindrical sidewall of the metal container body. The printing apparatus is provided with an ink cartridge for each color that one wishes to apply onto the metal beverage container body.

The ink cartridges supply ink to printing plates, which have art in relief corresponding to finished art to be printed onto the metal container. This finished art may be a text, a figure, or any type of graphic which one wishes to print on a metal container. Thus, it is very important to position the printing plate correctly relative to the metal container and the ink cartridges.

It is also important to note that the relief art present on the printing plates is in high relief wherein ink supplied to the art in high relief on the printing plates transfers to a transfer blanket. This transfer blanket is an ink transferring means between the printing plates and the metal container to be printed, generally produced from a rubber, rubber-like, or other pliable material.

The ink-laden relief features on each printing plate come into contact with a single transfer blanket. Thus, each transfer blanket receives ink from a plurality of printing plates to produce a finished artwork design. This is carried out by rotation of a printing plate, which transfers the ink present in relief to the transfer blanket, which is fixed on a transfer blanket drum, which has a rotation synchronized with (i) the metal container bodies to be printed, (ii) the positioning of the transfer blankets that are on the surface of the transfer blanket drum, and (iii) the printing plates.

Each container body engages just one transfer blanket to receive a complete finished art design of multiple colors that the transfer blanket has received from a plurality of printing plates.

A recent development in container body decorating includes providing art in the form of relief features on the transfer blankets. Thus, rather than having a single flat surface that receives ink from the printing plates, each transfer blanket has art in relief, typically low relief engravings or cooperating regions in high and low relief, to produce differing final images on consecutively decorated metallic container bodies on a dry offset rotary container body decorator. This recent improvement allows a manufacturer to decorate containers bodies in a manufacturing queue continuously and without interruption wherein consecutive container bodies are decorated with different images.

However, this prior process limits the manufacturer to a maximum of N different designs on N consecutively decorated container bodies, where N is the number of transfer blankets on a given decorating apparatus. There is a need within the industry to produce an unlimited number of finished art designs on consecutively decorated container bodies within the industry.

Additionally, small-batch beverage producers are becoming increasingly more popular. Unfortunately, due to the economies associated with producing decorated container bodies, small-batch producers can be limited to purchasing unadorned container bodies and will often add a sleeve of some sort to adorn the container bodies with source identifying indicia.

More recently, developers have introduced methods of decorating metallic container bodies using inkjet printhead techniques. One advantage of these methods is that decorators would be free of the limitations of typical dry offset decorators currently used to adorn container bodies. These methods would largely supplant or reduce dependence on the engraved printing plates by using ink jet printheads in combination with printing plates or by replacing printing plates altogether. Thus, this technology would result in decorator apparatuses capable of printing an unlimited number of different designs on consecutively decorated container bodies on a single decorator apparatus. In other words, by way of an example, a decorator outfitted with eight transfer blankets would go from having the capability of printing 8 different finished designs on eight consecutively decorated container bodies to an unlimited number of finished designs on an unlimited number of decorated container body in a queue of consecutively decorated container bodies.

In typical dry offset and digital container body decorating systems, no particular pretreatment of the container bodies is performed other than application of a precoat on the bare surfaces of the container bodies in certain cases to improve the quality of the final decoration.

The present invention is provided to solve the problems discussed above and other problems, and to provide advantages and aspects not provided by prior container decorators. A full discussion of the features and advantages of the present invention is deferred to the following detailed description, which proceeds with reference to the accompanying drawings.

SUMMARY

A first aspect of the present disclosure is directed to a container component decorating apparatus. The decorating apparatus delivers one or more art graphics to a plurality of container components in a manufacturing queue. The decorating apparatus comprises a container component handling module. The module comprises one or more holders which retain the container components to the apparatus. The apparatus includes a supply of one or more fluids to be deposited onto the container components. A source of thermal energy is thermally couplable to the container component, wherein a thermal energy is transferred from the source to the container component prior to one or more fluid droplets from the source fluid being deposited on a non-absorbent surface of the container component.

The first aspect of the disclosure may include one or more of the following features, alone or in any reasonable combination. The thermal energy from the source of thermal energy may maintain a temperature above an ambient temperature. The temperature maintained may be between 25° to 125° C. The temperature maintained may be between 30° to 100° C. The temperature maintained may be between 35° to 95° C. The temperature maintained may be between 40° to 90° C. The source of thermal energy may be thermally couplable to the container component via the one or more holders. Thermal energy may be transferred via conduction. The thermal energy may be transferred via radiation. The thermal energy may be carried by a medium. The medium may be a solid surface of the one or more holders. The medium may be a fluid. The medium may be a gas. The medium may be a liquid. The one or more holders may comprise a vacuum chuck wherein a source of a vacuum pressure retains the container component to the container component decorating apparatus. The apparatus may further comprise one or more inkjet printheads comprising one or more nozzles through which the one or more fluid droplets are delivered. The one or more fluids may comprise a plurality of pigmented fluids. The one or more fluids may comprise a basecoat upon which a pigmented fluid is deposited. The thermal energy may be transferred to the container component simultaneously with a deposit of the fluid on the non-absorbent of the container component. The one or more fluid droplets may be pinned. The one or more pinned fluid droplets create a tack-free surface on the non-absorbent surface of the container component. A cure of the one or more droplets may be accelerated as a result of thermal energy transfer. The fluid may be at least one of a water-based fluid, a semi-water-based fluid, or a solvent-based. Deposit of the one or more fluid droplets onto the non-absorbent surface of the container component may be performed in a non-contact fashion, wherein one or more fluid droplets travel from a source to the container through a fluid-based medium. One or more additional fluid droplets may be subsequently deposited on the non-absorbent surface of the container near or on top of the previously deposited one or more droplets of fluid. The apparatus may further comprise a print site, wherein the container component handling module sequentially delivers container components to the print site, wherein the one or more droplets of fluid are deposited onto the container component at the print site. The container components may be decorated with an art graphic on the container component decorating apparatus. The container component decorating apparatus may be a digital printing apparatus. The source of thermal energy may be selected from the group consisting of a source of an electron beam, a source of ultraviolet radiation, a source of near infrared radiation, and a source of infrared radiation. The source of thermal energy may be coupled to an interior volume of the container component wherein the thermal energy is transferred from the source of thermal energy to an inner surface of the container component wherein the one or more fluid droplets from the source of one or more fluids deposited on the non-absorbent surface of the container component is pinned to an outer surface of the container component.

A second aspect of the disclosure is directed to a method of decorating a container component comprising the steps of:

i. warming a non-absorbent surface of a container component; and
ii. applying one or more droplets of a pigmented fluid onto the non-absorbent surface of the container component subsequent to the warming step.

The second aspect of the disclosure may include one or more of the following features, alone or in any reasonable combination. The method may further comprise the step of applying one or more additional droplets of pigmented fluid subsequent to applying the one or more droplets of pigmented fluid. The method may further comprise the step of pinning the one or more droplets of the pigmented fluid onto the non-absorbent surface, wherein a warmed surface of the container component at least partially cures the one or more droplets of pigmented fluid prior to additional droplets of fluid being deposited onto the non-absorbent surface of the container component. The step of pre-heating the container component may be performed prior to the warming step. The method may further comprise the step of maintaining a temperature of the container component subsequent to the warming step. The method may further comprise the step of fixing a location of the one or more droplets of pigmented fluid by at least partially curing the one or more droplets prior to depositing an additional droplet of pigmented fluid. The method may further comprise the step of maintaining a temperature of the container component at a temperature above ambient temperature during the applying step. The temperature maintained may be between 25° to 125° C. The temperature maintained may be between 30° to 100° C. The temperature maintained may be between 35° to 95° C. The temperature maintained may be between 40° to 90° C. The method may further comprise the step of thermally coupling a source of thermal energy to the container component. The source of thermal may be at least one of a fluid, gas, and a solid. The thermally coupling step may be performed concurrently with the warming step. The method may further comprise the step of attaching the container component to a holder, wherein the holder retains the container component to decorator apparatus on which the method is performed. The holder may be thermally coupled to the container component. The holder may be at least one of a mandrel, a vacuum chuck, and a magnet. The pigmented fluid may comprise at least one of a water-based fluid, a semi-water-based fluid, or a solvent-based fluid. The applying step may be performed in a non-contact fashion, wherein the one or more droplets travel from a source to the container through a fluid-based medium. The fluid-based medium may be air. The source may be an inkjet printhead. The source of thermal energy may be coupled to an interior volume of the container component wherein the thermal energy is transferred from the source of thermal energy to an inner surface of the container component wherein the one or more fluid droplets deposited on the non-absorbent surface of the container component is pinned to an outer surface of the container component during the warming step.

Other features and advantages of the disclosure will be apparent from the following specification taken in conjunction with the following drawings.

BRIEF DESCRIPTION OF THE DRAWINGS

To understand the present disclosure, it will now be described by way of example, with reference to the accompanying drawings in which.

DETAILED DESCRIPTION

Figure 1:
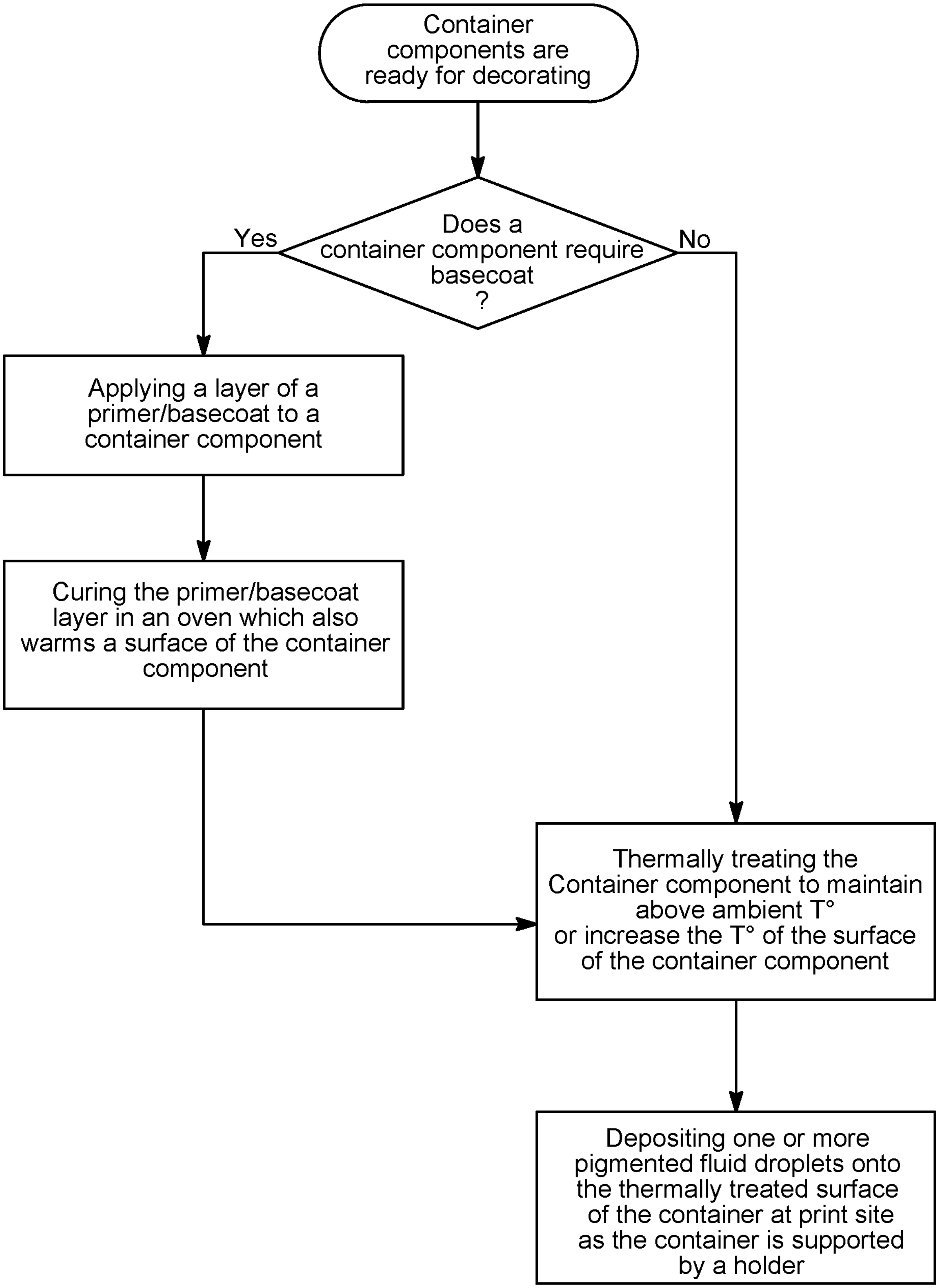
FIG. 1 is a flowchart of a method of the disclosure in which a temperature of a container component is maintained above ambient temperature or increased prior to droplets of pigmented fluid for decorating the container component are deposited onto the container component.
Figure 2:
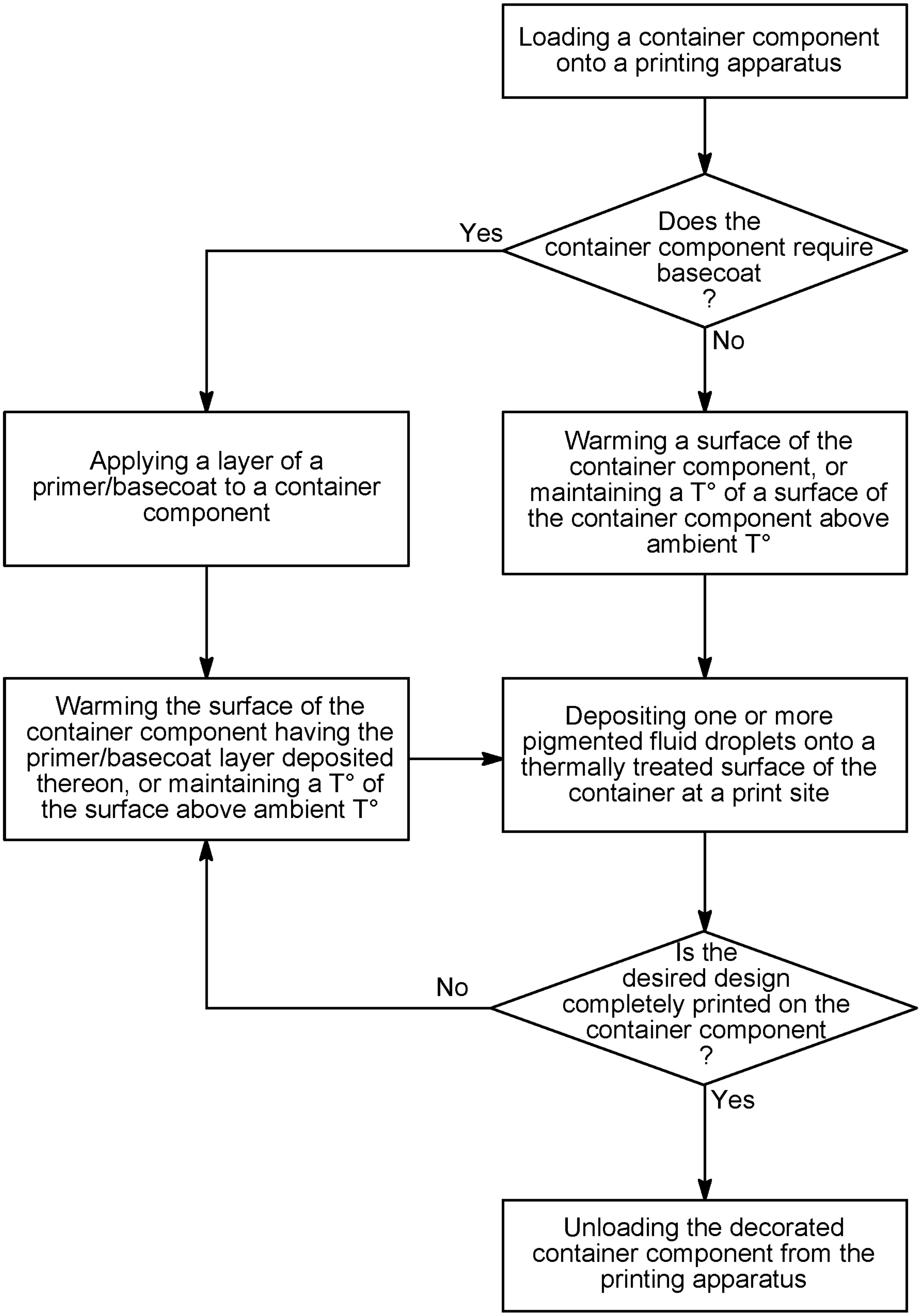
FIG. 2 is a flowchart of a method of the disclosure in which a basecoat/primer layer may optionally be applied to a container component prior to a temperature of a container component being increased or maintained above ambient temperature prior to droplets of pigmented fluid for decorating the container component being deposited onto a warmed container component.
Figure 3:
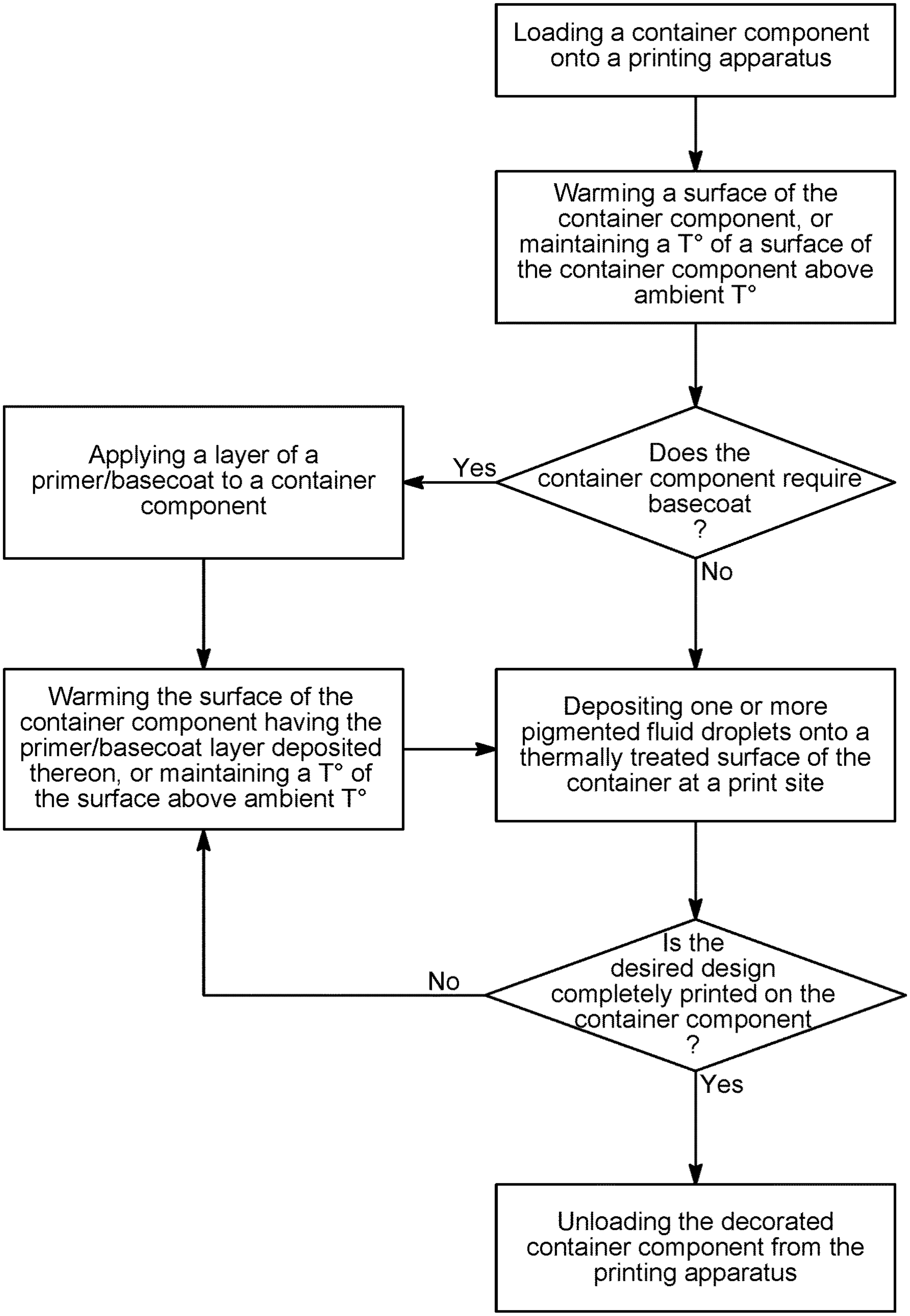
FIG. 3 is a flowchart of a method of the disclosure in which a basecoat/primer layer may optionally be applied to a warmed container component prior to droplets of pigmented fluid for decorating the container component being deposited onto a warmed container component.
Figure 4:
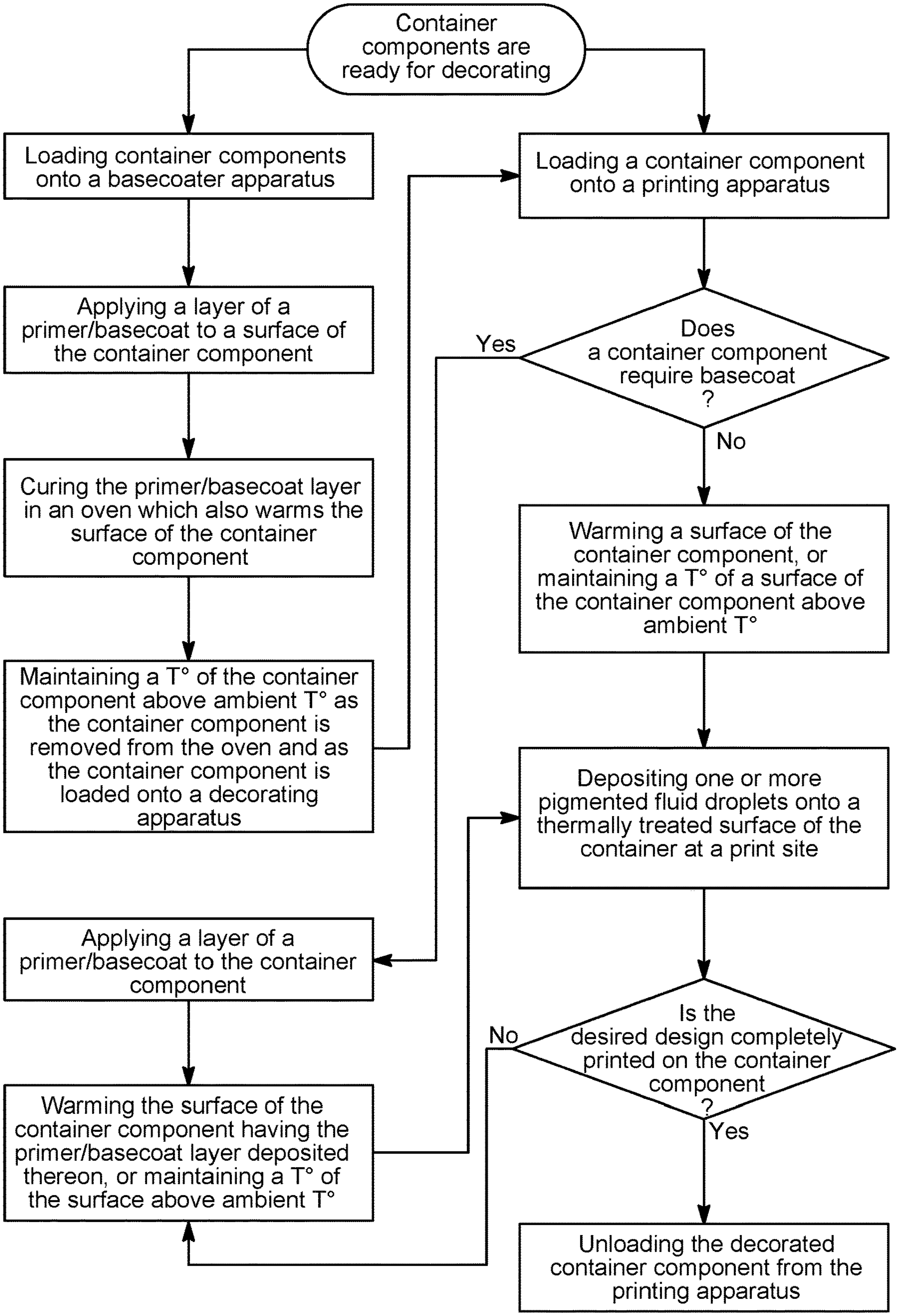
FIG. 4 is a flowchart of a method of the disclosure in which a basecoat/primer layer may optionally be applied, either at a separate basecoater and/or at the printing apparatus, to either a warmed container component or an ambient temperature container component, prior to droplets of pigmented fluid for decorating the container component being deposited onto a warmed container component.

While this disclosure is susceptible of embodiments in many different forms, there is shown in the drawings and will herein be described in detail preferred embodiments of the disclosure with the understanding that the present disclosure is to be considered as an exemplification of the principles of the disclosure and is not intended to limit the broad aspect of the disclosure to the embodiments illustrated.

The present disclosure utilizes a temperature control of a non-absorbent surface of a container as a surface treatment in a digital container decorating system. Surfaces of these containers are typically metallic, the containers themselves, including the decorated surfaces, are primarily produced from alloys of iron or aluminum. The temperature of the non-absorbent surface is controlled in at least one of before, during, and immediately after transfer of a pigmented fluid, for example ink, to the non-absorbent surface of the container.

The temperature control described herein is particularly applicable in non-contact ink applications where thermal energy is not as translated to an ink supply as in other types of printing. One type of non-contact container decorating is inkjet-type printing, for example digital, direct-to-shape jetting of stable fluid, applicable to both water-based fluids as well as solvent-based fluids. In the case of solvent-based fluids, the temperature control discussed herein may accelerate the process of digitally printed non-absorbent surfaces.

It is believed that the present disclosure will enable easier application and better quality with digitally applied pigmented fluids, including water-based and solvent-based inks and materials. The process described herein creates a natural pinning of an ink droplet of a first color on the non-absorbent surface, maintaining the ink droplet in a substantially fixed position on the non-absorbent surface and less likely to migrate or bleed into adjacent or nearby droplets of a second color.

Methods of the present disclosure are depicted in FIGS. 1-4. Generally, according to the methods of the disclosure, a container body, including a non-absorbent surface, is pre-heated prior to decorating. This heating can be performed in an oven, such as a primer/basecoat cure oven. The pre-heated container is loaded onto a printing apparatus and onto a thermally treated holder of the printing apparatus. A temperature of the non-absorbent surface of the container is maintained or elevated by thermal conductivity as the container is thermally coupled to the holder. The holder is moved to a print site on a printing apparatus. One or more pigmented fluid droplets are deposited onto the thermally treated, non-absorbent surface of the container at the print site as the container is supported by the holder. The one or more droplets are pinned. One or more additional pigmented fluid droplets are subsequently deposited onto the thermally treated, non-absorbent surface of the container near or on top of the previously deposited one or more droplets of pigmented fluid.

The disclosure can be further practiced on a container to deposit a basecoat or primer coat deposited onto the non-absorbent surface. The container is subjected to a source of thermal energy to establish a temperature of a non-absorbent surface of the container. The container is then loaded onto a thermally treated holder of a basecoat applicator. A temperature of the non-absorbent surface of the container is maintained or elevated by thermal conductivity as the container is thermally coupled to the holder. The holder is moved to a print site on the basecoat applicator. Here, a basecoat is applied to the non-absorbent surface of the container. One or more basecoat fluid droplets are deposited onto the thermally treated, non-absorbent surface of the container at the print site as the container is supported by the holder. The one or more droplets are pinned. One or more additional basecoat fluid droplets are subsequently deposited onto the thermally treated, non-absorbent surface of the container near or on top of the previously deposited one or more droplets of basecoat fluid. The basecoated container can then be transferred to a decorating apparatus, decorated on the same apparatus (i.e. the basecoat applicator), or subsequently processed in-line or off-line in a secondary operation.

As shown in FIG. 1, the disclosure can be practiced without pre-heating the container prior to loading the container onto printing apparatus. Here, the container may be loaded onto a thermally treated holder. The holder is thermally coupled to the container to transfer thermal energy to the container and increase the temperature of the container. The holder is moved to a print site on a printing apparatus. One or more pigmented fluid droplets are deposited onto the thermally treated, non-absorbent surface of the container at the print site as the container is supported by the holder. The one or more droplets are pinned. One or more additional pigmented fluid droplets are subsequently deposited onto the thermally treated, non-absorbent surface of the container near or on top of the previously deposited one or more droplets of pigmented fluid.

The pinning is a thermal pinning of the pigmented fluid or basecoat fluid droplets and may produce a "tack-free" surface via the thermally treated container having a sufficient temperature to accelerate a cure of the pigmented fluid or basecoat fluid.

Thermal energy is pre-determined to cause enough evaporation of the pigmented fluid or basecoat fluid to pin droplets of the pigmented fluid or basecoat fluid prior to further droplets of pigmented fluid or basecoat fluid being deposited onto the container. The temperature of the container sufficient to accomplish this is above ambient temperature, between 25° to 125° C., preferably between 30° to 100° C., more preferably between 35° to 95° C., and most preferably between 40° to 90° C., or and range or combination of ranges therein.

The pigmented fluid and the basecoat fluid may be a water-based fluid, a semi-water-based fluid, or a solvent-based.

The thermal coupling between the holder and the container may be accomplished by direct physical contact, liquid, gas, induction, radiation, etc.

The holder may be a vacuum chuck, mandrel, magnet, etc.

The depositing of the pigmented fluid droplets and basecoat fluid droplets onto the container is performed in a non-contact fashion. That is, the droplets travel from a source to the container through a fluid-based medium, such as air, to the container.

The present disclosure is applicable for every combination of with and without pre-heat for pinning between digital ink colors, multi-pass laydowns of coatings and primers, single machine/oven applications of basecoat, ink, and other coatings, pigmented and no-pigmented.

Figure 5:
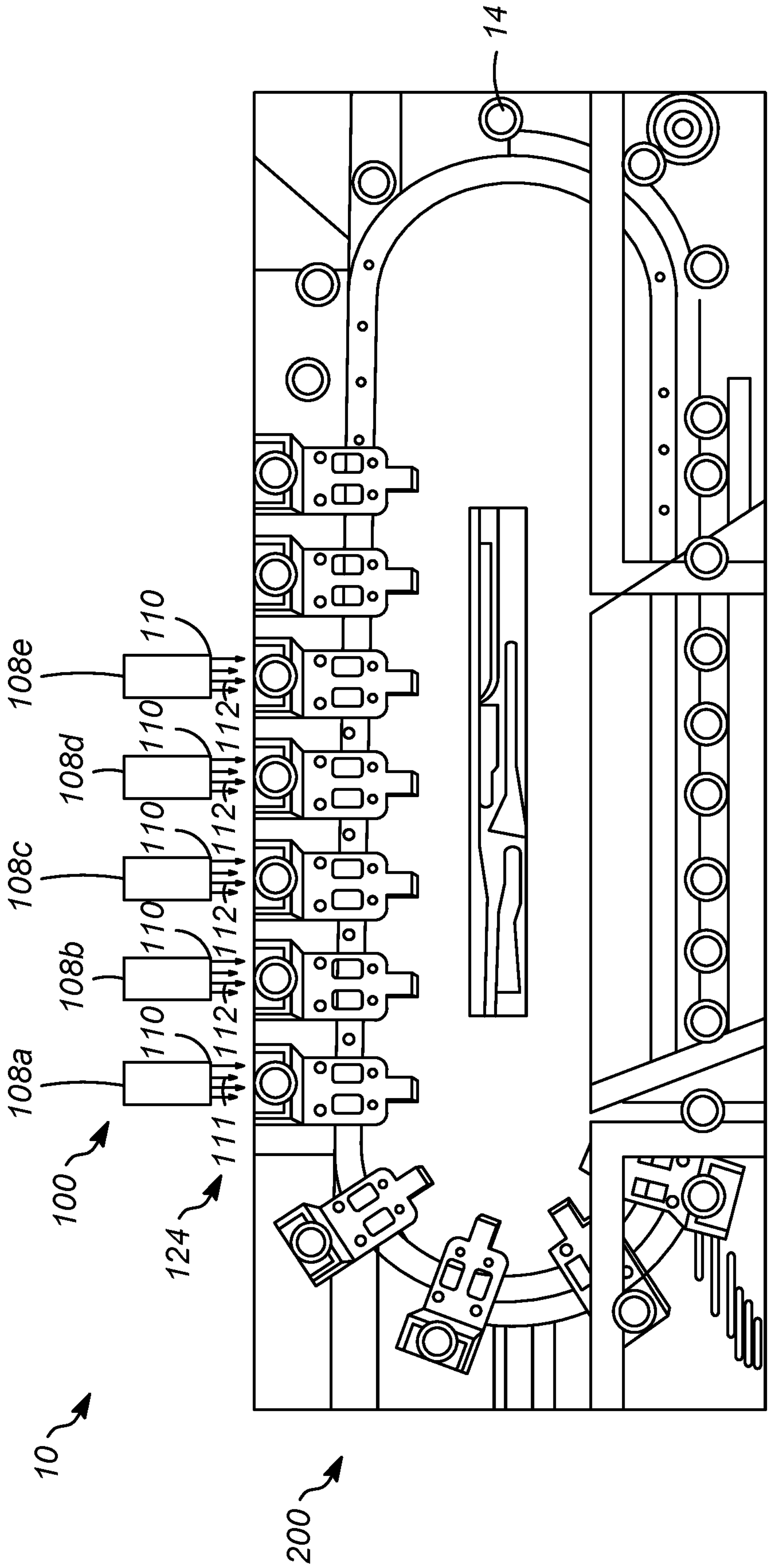
FIG. 5 is a side view of a digital container component decorator.
Figure 6:
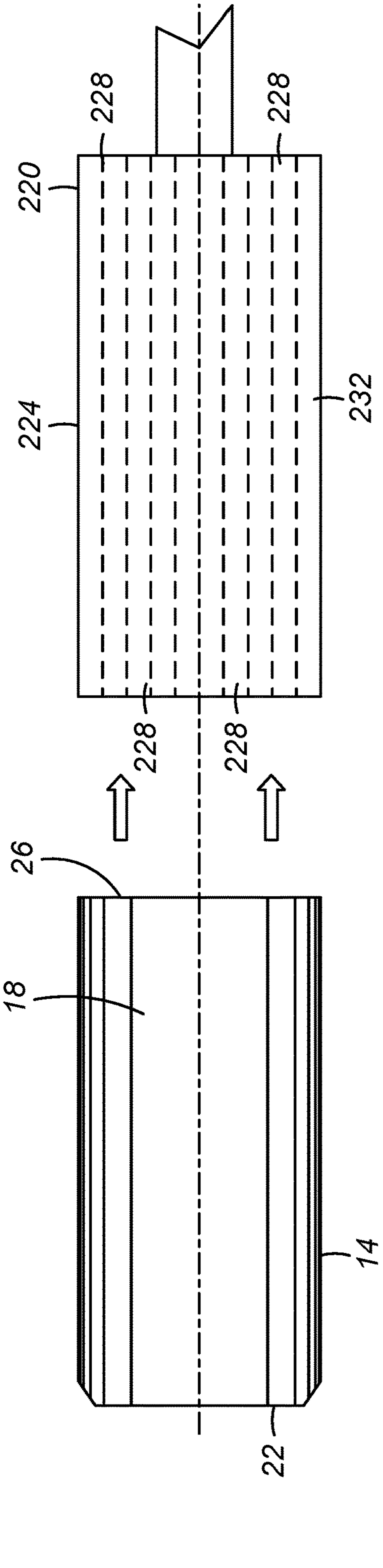
FIG. 6 is a side view of a container component and a holder prior to the holder being inserted into an interior thereof.

Now, referring to the FIGS. 5-8, the present disclosure is generally directed to the decoration of container components. As best illustrated in FIG. 6, an example of a container component is a container body 14. The container bodies 14 have a cylindrical sidewall 18 enclosed by an integral bottom 22 opposite an open end 26. While the embodiments described relate to metallic container bodies, one of ordinary skill in the art would readily understand that the principles of the disclosure can be practiced in the decoration of other container components, e.g., lids and ends.

FIG. 5 is a digital container component decorator 10. The decorator 10 has a printing module 100 and a container handling module 200.

The printing module 100 has a supply of fluid such as an inker unit 104 comprising a plurality of printing heads 108*a,b,c,d,e*, preferably inkjet print heads, each having a nozzle 110 through which primer or basecoat 111 or colored ink 112 is delivered. In the embodiment illustrated, a first print head 108*a* delivers the basecoat or primer 111, and the remaining 4 print heads 108 *b,c,d,e* deliver colored inks 112. The print heads 108*a-e* deposit or deliver a volume of basecoat 111 or ink 112 in a desired pattern directly onto a non-absorbent surface of the container body 14, typically the sidewall 18. This depositing of fluid droplets onto the non-absorbent surface of the container body 14 is performed in a non-contact fashion, wherein one or more droplets travel from the nozzle 110 to the container body 14 through a fluid-based medium, typically a gas, such as air. Thus, the ink-jet printing heads 108*b-e* deliver a quantity of ink 112 to the container body 14 to produce a desired pattern of ink 112 in a desired color, preferably an art graphic in multiple colors.

The digital decorator 10 incorporates a container handling module 200. This container handling module 200 is capable of continuously delivering container bodies 14 to a printing site 124 without interruption.

The container handling module 200 comprises at a plurality of holders 204. The holders 204 retain the container bodies 14 to the decorator 10. The holders 204 are inserted within the open ends 26 of the container bodies 14 and provide a support during transport of the container bodies 14 is a print site 124 on the digital decorator 10.

The decorator 10 allows for a temperature control of the container bodies 14 before, during and after depositing fluid droplets onto the container bodies 14, typically a pigmented fluid, such as a colored ink 112. Generally, a source of thermal energy 216 is thermally couplable to the container body 14 prior to the container body 14 reaching the print site 124. The thermal energy 220 is transferred from the source 216 onto the container body 14 prior to one or more fluid droplets 112 from the printing head 108 being deposited onto the sidewall 18 of the container body 14.

The thermal energy generally maintains and/or warms the container body 14 to at least slightly evaporate, cure or pin one or more droplets delivered from a print heads 108*a-e* prior to an additional one or more droplets of fluid are delivered from a printing head 108*a-e* to the container body 14. Pinning is a thermal pinning of the basecoat 111 or ink 112 fluid droplets which may produce a "tack-free" surface via the thermally treated container body 14 having a sufficient temperature to accelerate a cure of the basecoat 111 or ink 112 fluid. Generally, a temperature of the container body 14 sufficient to accomplish this is above ambient temperature, between 25° to 125° C., preferably between 30° to 100° C., more preferably between 35° to 95° C., and most preferably between 40° to 90° C., or and range or combination of ranges therein.

In one embodiment, the source of thermal energy 240 is thermally coupled to an interior volume of the container body 14 wherein the thermal energy 220 is transferred from the source of thermal energy 240 to an inner surface of the sidewall 18 of the container body 14. The fluid droplets on the non-absorbent surface outer surface of the container body sidewall 18 are pinned to the outer surface.

A tack-free surface is not always necessary. When the droplets delivered from the print heads 108*a-e* are an ink solution, there is a high likelihood that the method and apparatus will require a pin of the ink only to keep it in position as the container component spins and has over varnish (OV) applied when the curing would really happen in the oven as it is today. Under those conditions, a tack-free surface may be more than actually needed at the point of printing. However, when a basecoat is applied, a tack-free would likely be needed or preferred.

Figure 7:
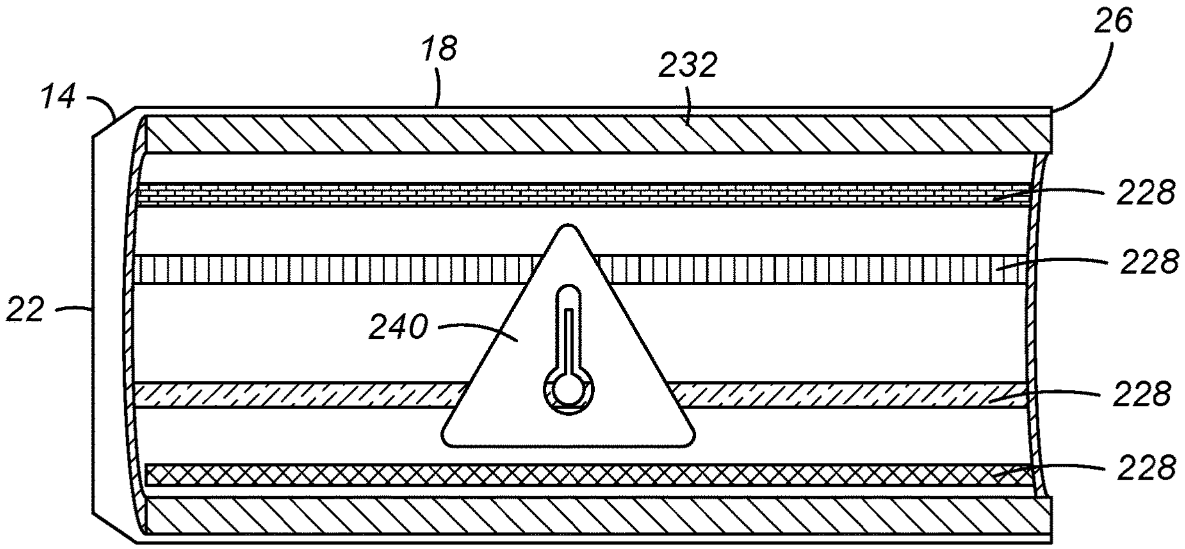
FIG. 7 is a cross-sectional view of a container component with a holder inserted into the interior thereof.

The thermal coupling can be accomplished using the holder 204, e.g. a mandrel 224 as illustrated on FIGS. 6 and 7. The mandrel 224 itself can be thermally treated in several different ways. For example, the mandrel 224 can be equipped with thermal conduits 228. These conduits 228 can carry heating elements such as electrical elements, liquids, inductors, and/or gasses. Thus, a thermal energy within the mandrel 224 can be carried by a medium to heat the mandrel 224, which heat can then be transferred to the container body 14. The medium can also include a solid wall 232 of the mandrel 224 which is in direct contact with the container body 14. As illustrated in FIGS. 6 and 7, a plurality of conduits 228 are embedded in the solid wall 232 of the mandrel 224.

Alternatively, or additionally, the mandrel 224 can be equipped with a chamber 236 and an additional source of thermal energy 240, such as a liquid or gas, can be provided to heat the sidewall 232 of the mandrel 224.

Figure 8:
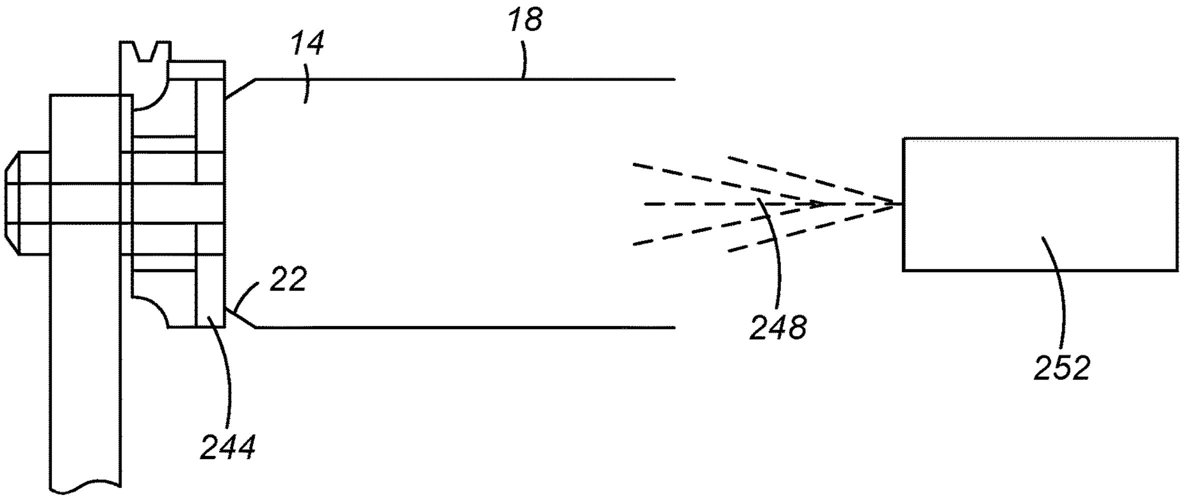
FIG. 8 is an alternative holder retaining a container component thereto.

As shown in FIG. 8, the holder 204 can also take the form a vacuum chuck or magnet 244 which retains the container body 14 to the decorator 10. Here, a hot fluid 248, such as liquid or gas, from a source 252 can be delivered to the container body 14 prior to the container body reaching the pint site 124.

Alternatively, the thermal energy can be provided from a source of an electron beam, a source of ultraviolet radiation, a source of near infrared radiation, and/or a source of infrared radiation. ISO 20473 defines near-infrared radiation as electromagnetic radiation with wavelengths ranging from 780 nm to 3.0 μm (ISO 2007).

The present disclosure provides many potential advantages. It can reduce the use of in-line ovens, provide more flexibility to layer more coating materials (e.g. double-coat), allow use of lower cost inkjet inks making digital decorating more cost effective, open up decorating to more OV materials because it eliminates wet-on-wet application (see spot matte), provide potential use of a wider selection of basecoat fluid, and lower cost. The methods described herein increase a process window of direct to shape (DTS) printing (aqueous or solvent) without the use of UV cure materials. This is an advantage because UV cure materials (with photo initiators) are expensive and may carry safety concerns. With a spinning non-absorptive container component surface, such as a container body, thermal surface control as described herein keeps ink droplets in position on the spinning container component surface at spin speed and conversely open the operating process window. DTS indexing printer platforms could all handle support of this technology with retrofit, for example, such technology marketed by Hinterkopf, ToneJet, Velox, SLAC, Martinenghi, etc.

The methods of the present disclosure can be used in conjunction with certain hybrid inks, for example, that include low levels of UV photo initiators. These hybrid inks with low levels of UV photo initiators could be used to pin the ink droplets in place color-by-color, but a final cure could be on a thermally treated or heated container component. Similarly, water and solvent, solvent evaporates off from hitting heated can surface, remaining water is evaporated off in more standard means in a pin oven following OV.

While the specific embodiments have been illustrated and described, numerous modifications come to mind without significantly departing from the spirit of the disclosure, and the scope of protection is only limited by the scope of the accompanying Claims.

What is claimed is:

1. A container component decorating apparatus, the decorating apparatus delivering one or more art graphics to a plurality of container components in a manufacturing queue, the decorating apparatus comprising:

a container component handling module comprising one or more holders which retain the container components to the apparatus, wherein the source of thermal energy is thermally couplable to the container component via the one or more holders, wherein each of the one or more holders has at least one of a magnet or a vacuum chuck which retains the container component to the decorator;

a supply of one or more fluids to be deposited onto the container components;

a print site where the one or more fluids are deposited onto the container components; and a source of thermal energy thermally couplable to the container component upstream from the print site, wherein a thermal energy is transferred from the source of thermal energy to the container component prior to one or more fluid droplets from the source of one or more fluids being deposited on a non-absorbent surface of the container component.

2. The container component decorating apparatus of claim 1, wherein the thermal energy from the source of thermal energy maintains a temperature above an ambient temperature.

3. The container component decorating apparatus of claim 2 wherein the temperature maintained is between 25° to 125° C.

4. The container component decorating apparatus of claim 2 wherein the temperature maintained is between 30° to 100° C.

5. The container component decorating apparatus of claim 2 wherein the temperature maintained is between 35° to 95° C.

6. The container component decorating apparatus of claim 2 wherein the temperature maintained is between 40° to 90° C.

7. The container component decorating apparatus of claim 1 wherein thermal energy is transferred via conduction.

8. The container component decorating apparatus of claim 1 wherein the thermal energy is transferred via radiation.

9. The container component decorating apparatus of claim 1 wherein the thermal energy is carried by a medium.

10. The container component decorating apparatus of claim 9 wherein the medium is a fluid.

11. The container component decorating apparatus of claim 9 wherein the medium is gas.

12. The container component decorating apparatus of claim 11 wherein:

the source of thermal energy is thermally coupled to an interior volume of the container component wherein the thermal energy is transferred from the source of thermal energy via the gas to an inner surface of the container component, the source of thermal energy is spaced from the at least one holder, and the thermal energy is delivered from the source of energy, across the space, and to and through an open end of the container component, wherein the one or more fluid droplets from the source of one or more fluids deposited on the non-absorbent surface of the container component is pinned to an outer surface of the container component.

13. The container component decorating apparatus of claim 9 wherein the medium is a liquid.

14. The container component decorating apparatus of claim 1 further comprising a plurality of inkjet print heads one or more inkjet printheads comprising one or more nozzles through which the one or more colored inks are delivered.

15. The container component decorating apparatus of claim 1 wherein the thermal energy is transferred to the container component simultaneously with a deposit of the fluid on the non-absorbent of the container component.

16. The container component decorating apparatus of claim 1 wherein the one or more fluid droplets are pinned.

17. The container component decorating apparatus of claim 16 wherein one or more droplets produces a tack-free surface on the non-absorbent surface of the container component.

18. The container component decorating apparatus of claim 16 wherein a cure of the one or more droplets is accelerated as a result of thermal energy transfer.

19. The container component decorating apparatus of claim 1 wherein deposit of the one or more fluid droplets onto the non-absorbent surface of the container component is performed in a non-contact fashion, wherein one or more droplets travel from a source to the container through a fluid-based medium.

20. The container component decorating apparatus of claim 1 wherein the source of thermal energy is selected from the group consisting of a source of an electron beam, a source of ultraviolet radiation, a source of near infrared radiation, and a source of infrared radiation.

21. The container component decorating apparatus of claim 1 wherein the source of thermal energy is coupled to an interior volume of the container component wherein the thermal energy is transferred from the source of thermal energy to an inner surface of the container component wherein the one or more fluid droplets from the source of one or more fluids deposited on the non-absorbent surface of the container component is pinned to an outer surface of the container component.

22. A metallic container component decorating apparatus, the metallic container component decorating apparatus delivering one or more art graphics to a plurality of aluminum container components in a manufacturing queue, the decorating apparatus comprising:

a container component handling module comprising one or more holders which retain each of the plurality of aluminum container components to the apparatus, wherein the source of thermal energy is thermally couplable to each of the plurality of aluminum container component via the one or more holders;

a supply of one or more fluids to be deposited onto each of the plurality of aluminum container components;

a print site where the one or more fluids are deposited onto each of the plurality of aluminum container components; and a source of thermal energy thermally coupled to each of the plurality of aluminum container components upstream from the print site, wherein a thermal energy is transferred from the source of thermal energy to each of the plurality of aluminum container components prior to one or more fluid droplets from the source of one or more fluids being deposited on a metallic non-absorbent surface of each of the plurality of aluminum container components, wherein the thermal energy from the source of thermal energy maintains a temperature of the metallic non-absorbent surface of each of the plurality metallic container components above an ambient temperature, wherein the temperature maintained is between 25° to 125° C., and wherein the temperature of the container component is sufficient to pin the one or more fluid droplets to an outer surface of the metallic non-absorbent surface of each of the plurality metallic container components.

* * * * *